(12) United States Patent  
Lindholm et al.

(10) Patent No.: US 8,499,340 B2
(45) Date of Patent: Jul. 30, 2013

(54) IMS NETWORK IDENTITY MANAGEMENT

(75) Inventors: Fredrik Lindholm, Stockholm (SE); Carolina Canales Valenzuela, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 940 days.

(21) Appl. No.: 12/124,510

(22) Filed: May 21, 2008

(65) Prior Publication Data
US 2008/0301787 A1 Dec. 4, 2008

Related U.S. Application Data

(60) Provisional application No. 60/940,514, filed on May 29, 2007.

(51) Int. Cl.
*G06F 21/00* (2006.01)
(52) U.S. Cl.
USPC ............... 726/5; 709/200; 709/249; 455/424; 455/461; 370/401; 370/466
(58) Field of Classification Search
USPC .......................................................... 726/5, 3
See application file for complete search history.

(56) References Cited

U.S. PATENT DOCUMENTS

| | | | | |
|---|---|---|---|---|
| 6,507,908 B1 * | 1/2003 | Caronni | ........................ | 713/153 |
| 6,721,784 B1 * | 4/2004 | Leonard et al. | ................ | 709/206 |
| 6,898,436 B2 * | 5/2005 | Crockett et al. | ............... | 455/518 |
| 7,245,927 B2 * | 7/2007 | Hansen | ........................... | 455/461 |
| 7,283,822 B2 * | 10/2007 | Gallagher et al. | ............ | 455/436 |
| 7,283,988 B1 * | 10/2007 | Peterson | ............................. | 1/1 |
| 7,305,492 B2 * | 12/2007 | Bryers et al. | .................. | 709/249 |
| 7,392,538 B2 * | 6/2008 | Okamoto et al. | ................ | 726/11 |
| 7,562,382 B2 * | 7/2009 | Hinton et al. | ...................... | 726/2 |
| 7,606,186 B2 * | 10/2009 | Hundscheidt et al. | ........ | 370/312 |
| 7,676,473 B2 * | 3/2010 | Alperin et al. | ........... | 707/999.01 |
| 7,757,272 B1 * | 7/2010 | Dean | ................................. | 726/2 |
| 7,788,408 B2 * | 8/2010 | Takeda et al. | ................. | 709/245 |
| 7,913,294 B1 * | 3/2011 | Maufer et al. | .................... | 726/3 |

(Continued)

OTHER PUBLICATIONS

3GPP Support, Valbonne—France|3rd Generation Partnership Project; Technical Specification Group Services and System Aspects; IP Multimedia Subsystem (IMS); Stage 2 (Release 7)|3GPP TS 23.228 V7.6.0 (Dec. 2006)| pp. 1-217| URL:http://www.3gpp.org/ftp/specs/archive/23_series/23.228/23228-760.zip.*
Community Support and Identity Management|http://bluecoat-01/?cfru=aHR0cDovL3d3dy5yZXNlYXJjaGdhdGUubmV0L3B1YmxpY2F0aW9uLzlyMTU1MzI4NV9Db21tdW5pdHlfHlfc3Vwc G9ydF9hbmRfaWRlbnRpdHlfbWFuYWdlbWVudC9maWxlL 2Q5MTJmNTBiZTc4NWNhMGU2Ni5wZGY=|Koch et al. |2001|pp. 20.*

*Primary Examiner* — Mahfuzur Rahman
(74) *Attorney, Agent, or Firm* — Coats & Bennett, P.L.L.C.

(57) ABSTRACT

Methods and apparatus for enabling secure communications between a UE (user equipment) device operating though a packet-switched network and a $3^{rd}$ party service outside of the user's home domain. The packet-switched network may be, for example, configured according and IMS architecture and use SIP control signaling. An identity server in the user's home domain is coupled with a proxy server or gateway and receives control messages, on which the identity server effects identity translation if needed. Translating messages targeted for the third party serve includes stripping user identifying information and adding a domain identifier to the message. It may also include adding an identity token. Where an identity token is not added, it may be provided upon request to a $3^{rd}$ party service entity. Translating messages targeted for the UE includes adding a user identifier for home domain routing.

17 Claims, 8 Drawing Sheets

U.S. PATENT DOCUMENTS

| | | | |
|---|---|---|---|
| 8,037,530 B1* | 10/2011 | Fink et al. | 726/23 |
| 2002/0042277 A1* | 4/2002 | Smith | 455/456 |
| 2004/0165603 A1* | 8/2004 | D'Angelo et al. | 370/401 |
| 2006/0104431 A1* | 5/2006 | Emery et al. | 379/211.04 |
| 2006/0154665 A1* | 7/2006 | Svensson et al. | 455/436 |
| 2008/0021866 A1* | 1/2008 | Hinton et al. | 707/2 |
| 2008/0076386 A1* | 3/2008 | Khetawat et al. | 455/410 |
| 2008/0120705 A1* | 5/2008 | Beyer et al. | 726/5 |
| 2008/0168540 A1* | 7/2008 | Agarwal et al. | 726/5 |
| 2008/0301785 A1* | 12/2008 | Beyer et al. | 726/5 |
| 2009/0225961 A1* | 9/2009 | D'Angelo et al. | 379/88.17 |
| 2010/0169424 A1* | 7/2010 | Gustafsson et al. | 709/206 |

* cited by examiner

IMS NETWORK IDENTITY MANAGEMENT

CROSS REFERENCE TO RELATED APPLICATION AND CLAIM OF PRIORITY

This application is related to, and claims the benefit of the filing date of U.S. Provisional Patent Application Ser. No. 60/940,514, which was filed on 29 May 2007, and which is incorporated herein by reference in its entirety.

BACKGROUND OF THE INVENTION

The present invention is directed generally to facilitating communications in packet-switched networks, and is directed more specifically to identity management in the IMS (3GPP IP (Internet protocol) multimedia subsystem) context in a manner that enables anonymous access by users to $3^{rd}$ party application servers.

There are many types of communications networks, and they are used for a variety of purposes. Voice networks have been in place for some time in the form of the familiar PSTN (public switched telephone network) and, more recently, PLMNs (public land mobile networks) for mobile users. Each of these is, generally speaking, a circuit-switched network where a dedicated circuit is set up between a calling party and a called party for the duration of the call. In a packet-switched network, by contrast, information to be communicated is divided into small packets that are individually addressed and sent through a series of interconnected components such as routers and servers until they reach their destination where they are reassembled. These types of networks were developed chiefly for interconnecting computers or computer networks. Packet-switched networks may be relatively small, such as a LAN (local area network) or vast, as is the case with the well-known Internet. The Internet is actually a collection of computer networks that are linked together so that they can communicate with each other. Naturally, for this to be possible each of these networks must use a common set of rules for assembling and transmitting information packets. A basic set of rules enabling Internet communications is referred to as the IP (Internet protocol).

Components of communication networks are themselves also configured and operated according to standard protocols that have been (and continue to be) developed and promulgated by standard-setting bodies. On such group is the 3GPP ($3^{rd}$ Generation Partnership Project). 3GPP has, for example, promulgated standards for a new network architecture known as IMS (IP Multimedia Subsystem). IMS is an architectural framework for delivering multimedia content for mobile users. Multimedia, as its name implies, includes traditional voice and data communication as well as streaming audio and video or a combination of all of these. The IMS architectural framework is directed to session and connection control services as well as application services. It is an effort to collectively define all IP-based wireless services such as voice and data as well as signaling and control. A brief overview of an IMS network follows.

FIG. 1 is a simplified block diagram illustrating a network 100 including selected components related to operation of an IMS, in which embodiments of the present invention may be advantageously implemented. Network 100 includes an AS (application server) 105 connected to application 110 and HSS (home subscriber server) 115. Application servers provide services related to IMS communications and interface with the applications 110 themselves. Note that although this depiction of the IMS architecture shows a single AS and application, in reality of course there are many such devices in the communication network. The HSS 115, typically associated with a mobile user's home network (or domain), and maintains information useful to the IMS such as subscriber profiles and current location. These components are considered to be part of the application and services layer of the IMS architecture.

The application and services layer interfaces with an IMS layer using SIP (session initiation protocol) control signaling. Specifically, the AS 105 and the HSS 115 communicate with the CSCF (call session control function) 120 to perform such functions as setting up and terminating communication sessions. CSCF 120 is part of the IMS layer, and is actually representative of the P-CSCF (proxy-CSCF) 122, the ICSCF (interrogating-CSCF) 124, and the S-CSCF (serving-CSCF) 126. Generally speaking, the S-CSCF 122 interfaces directly with the AS 105, while the P-CSCF 126, which may be in a user's home network or in a visited network, is the proxy server that initially directs user call toward their target destination. Also shown in the IMS layer of FIG. 1 is a GW (gateway) 140, which allows the IMS to communicate with outside networks such as $3^{rd}$ party network 150. As used herein, "$3^{rd}$ party network" is a general term for describing networks and entities outside of a particular user's home domain these "outside" entities may or may not be "trusted", that is, have an established and verifiable relationship with the home network.

The access layer of an IMS network enables mobile users to access the services offered via the IMS. In FIG. 1 the access layer is represented by access networks 130, which include for example cellular networks and WLANs (wireless LANS). Access networks 130 typically interface with the CSCF 120 via a packet-switching IP network (not shown). UE (user equipment) 135 represents the mobile device carried by a network subscriber.

When a user seeks the services offered by an AS, the UE 135 establishes contact with an access network 130, and a communication session is established. When the AS is in the user's home domain, as with AS 105, access will be permitted (or denied) based on the home network's security procedures. At times, however, a user will wish to establish a call to an AS outside of the home domain, for example thorough GW 140 to $3^{rd}$ party network 150. If accomplished in the same manner as home-domain access, some concerns arise. The outside AS in $3^{rd}$ party network 150 may not be known to the home domain or "trusted", and providing it with the identity of the user of UE 135 during the communication session may enable it to later contact the user for purposes that may be undesirable or even malicious. The outside AS may, for example, send unwanted advertising or surveillance programs to the UE 135, or attempt to 'steal' the user from the home network. According to existing IMS procedures, however, the user identity is provided to the AS so that, among other reasons, the outside AS may address return messages to the user.

BRIEF SUMMARY OF THE INVENTION

To address the above-discussed deficiencies of the prior art, it is a primary object of the present invention to provide a method and arrangement for identity management that enables added security when accessing third-party service providers in a communication session via a packet-switched network such as one configured according to IMS (IP (Internet protocol) multimedia subsystem) architecture.

In one aspect, the present invention is a method of setting up a communication session between a user and a $3^{rd}$ party service via an IMS including receiving, in an identity server associated with the home domain, a control message relating to the communication session, determining whether identity translation of the control message is necessary, performing identity translation with respect to the control message if it is determined to be necessary, and sending the translated control message toward its target. The control message may be, for example, an SIP (session initiation protocol) INVITE or subsequent control message. For control messages originating at the home domain UE (user equipment) and targeted for the $3^{rd}$ party service, the identity translation may include removing the explicit user identifier in the message header and adding a domain identifier such that a subsequent recipient of the control message can identify the identity server. The method may further include providing an identity token, either as part of the header of the modified control message or in response to a fetch assertion message received from an entity associated with the $3^{rd}$ party service. For control messages from the $3^{rd}$ party service, identity translation may include removing a domain identifier from the control message and replacing it with a normal user identifier for routing the message within the home network.

In another aspect the present invention is an identity server for use in an IMS environment, including a network interface for receiving control messages and for sending translated control messages, a determiner coupled to the network interface for determining whether identity translation of the control message is necessary, and a translator for performing identity translation with respect to the control message if it is determined to be necessary by the determiner. The identity server may be a separate component or may reside on a node that also includes one or more other IMS entities, such as an HSS (home subscriber server) or CSCF (call session control function). The identity translation performed by the identity server may include removing a user identifier and adding a domain identifier or an identity token such that a subsequent recipient of the control message can identify the identity server. For incoming messages, identity translation may include removing a domain identifier and replacing it with an SIP user identifier.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 2 through 11, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet-switched communications network.

In accordance with the present invention, an identity server is provided, and is associated with a particular home domain. The identity server facilitates security in communications between users associated with the home domain and service providers. In an advantageous implementation, the home domain is configured according to an IMS (IP (Internet protocol) multimedia subsystem) architecture and uses SIP (session initiation protocol) control messages. The control messages are used, for example, when setting up a communication session (or "call"). The identity server performs identity translation on certain SIP control messages, usually those messages that involve a UE (user equipment) device associated with the home domain, and that target or are from entities outside the home domain. In this manner the user may fully access the services offered by the outside entity while the outside entity is not provided with information allowing it unsupervised access to the UE or the user's identity. Exemplary implementations of the present invention will now be described in greater detail.

Figure 1:
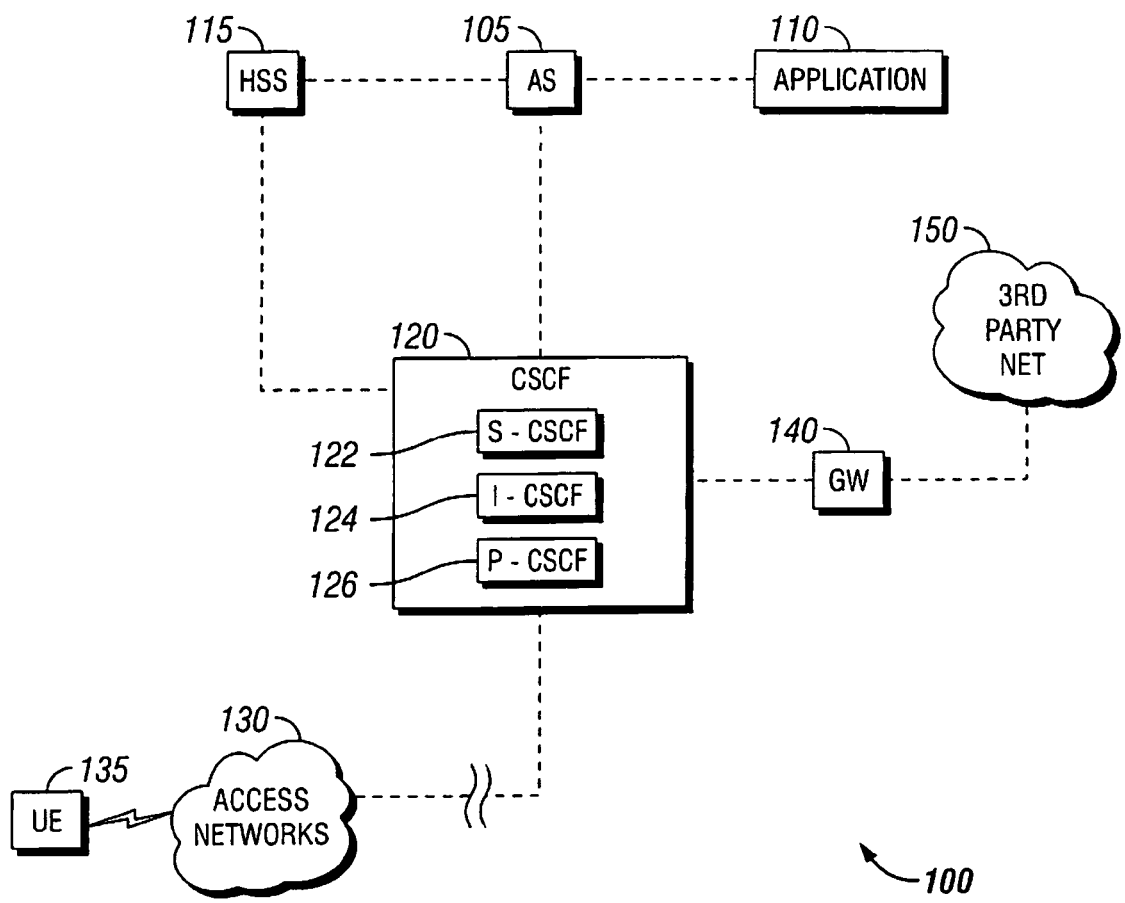
FIG. 1 is a simplified block diagram illustrating selected components of an IMS network in which the present invention may be advantageously employed.
Figure 2:
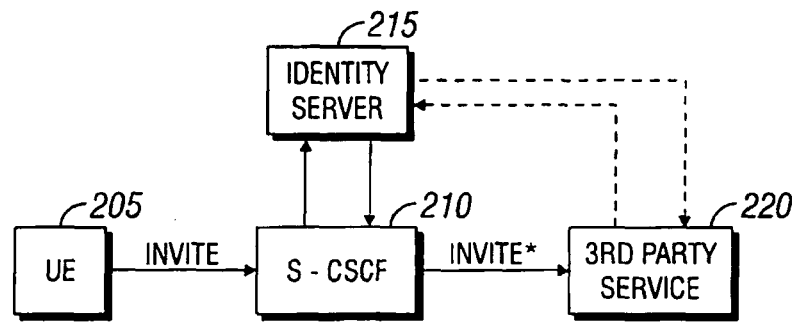
FIG. 2 is a simplified block diagram illustrating the initiation of an outgoing communication session according to an embodiment of the present invention.

FIG. 2 is simplified block diagram illustrating the initiation of an outgoing communication session according to an embodiment of the present invention. Note that for simplicity only selected components are shown. In the embodiment of FIG. 2, a UE 205 seeks to contact a $3^{rd}$ party service 220, and initiates a call set-up procedure. Here it will be presumed that these components interact at least in part in the context of an IMS configuration and use SIP control messages. Note also that here the term "outgoing" denotes a call set-up directed to the $3^{rd}$ party service 220.

The UE 205 initiates the call set-up by sending an SIP INVITE message according to usual network procedures. The INVITE message therefore includes normal IMS identifiers identifying the user of the UE 205. When the Invite message is received at the S-CSCF (serving-call session control function), the S-CSCF communicates with identity server 215. This communication may be based on a standard ISC (IMS service control) interface; that is, invoking the identity server 215 as an IMS application server. In an alternate embodiment, another interface may be used, for example using HTTP (hypertext transfer protocol) or another Web services-type protocol.

The identity server 215 then determines if identity translation is necessary. This will normally be true if the call is being set up with an outside entity such as $3^{rd}$ party service 220. In an alternate embodiment, the determination is made in the S-CSCF 210, which in this case does not invoke the identity server 215. However the determination is made, when necessary the identity server 215 then performs the identity translation. As used herein, "identity translation" denotes a substitution operation performed on a control message, specifically, substituting the user identifier for a domain identifier according to the present invention. A "domain identifier" identifies the home domain of the UE, and in some way identifies the identity server for the home domain. The identity server identification, for example, may be the address of the identity server or the address of another home-domain node (or a number of nodes) that will route messages to the identity server as appropriate. It may also indicate, for example, an HSS (home subscriber server) associated with the home domain where the address of (or path to) the identity server may be obtained. As should be apparent, the domain identifier will also include some way for the identity server to associate any response including the domain identifier with the user or the communication session or both.

In accordance with the present invention, identity translation may be performed by the identity server itself, receiving, modifying, and sending the control message, or by another node under direction from the identity server. That is, when S-CSCF 210 invokes the identity server 215, the identity server 215 may associate the call set up message with a domain identifier, and provide the domain identifier to the S-CSCF 210. The S-CSCF then generates an INVITE* message associated with the call set up, it includes this domain identifier. (The asterisk in INVITE* indicates the SIP control message includes a domain identifier instead of an explicit user identifier.) The INVITE* message including the domain identifier is then sent from the S-CSCF 210 to the $3^{rd}$ party service 220. Note that $3^{rd}$ party service 220 is representative of a number of components that are not individually shown in FIG. 2.

When the $3^{rd}$ party service 220 receives the INVITE message from the S-CSCF 210, it reads the domain identifier, and may use this information in a number of ways. It may, of course, simply send a SIP response message to indicate that the call set-up may continue. (Note that responses and subsequent control messaging are omitted from FIG. 2 for clarity. The acknowledgments to the INVITE (for example a 200 OK message or, 183 progress response, etc.) are sent back to the UE, being routed back over the same path from which the INVITE message was received according to normal IMS setup procedures. The translated identity is changed back to the user's identity as appropriate by the identity server.) It may also exercise access control, for example denying access to the $3^{rd}$ party services, either completely or unless more information is provided. The $3^{rd}$ party service 220 also may retrieve from the identity server 215 an identity token. This optional retrieval process is illustrated by the broken lines in FIG. 2. The identity token contains additional information related to the UE or user that may be used by the $3^{rd}$ party service in making access-control decisions or for other purposes, but it preferably will not include an explicit user identifier. The identity token's specific content may vary from one implementation to another. In an alternate embodiment (not shown in FIG. 2) the identity token is included in the translated control messages during the identity translation process. In this case, of course, the optional identity-token retrieval is not performed.

The identity server 215, which is associated with the UE's domain, preferably retains association information for later relating the identity token to the explicit identifier for the user of UE 205, and provides instructions to the appropriate servers so that control messages and content from the $3^{rd}$ party service 220 may be returned to the UE without revealing the user's identity outside the home domain. An example of this will now be discussed in greater detail.

Figure 5:
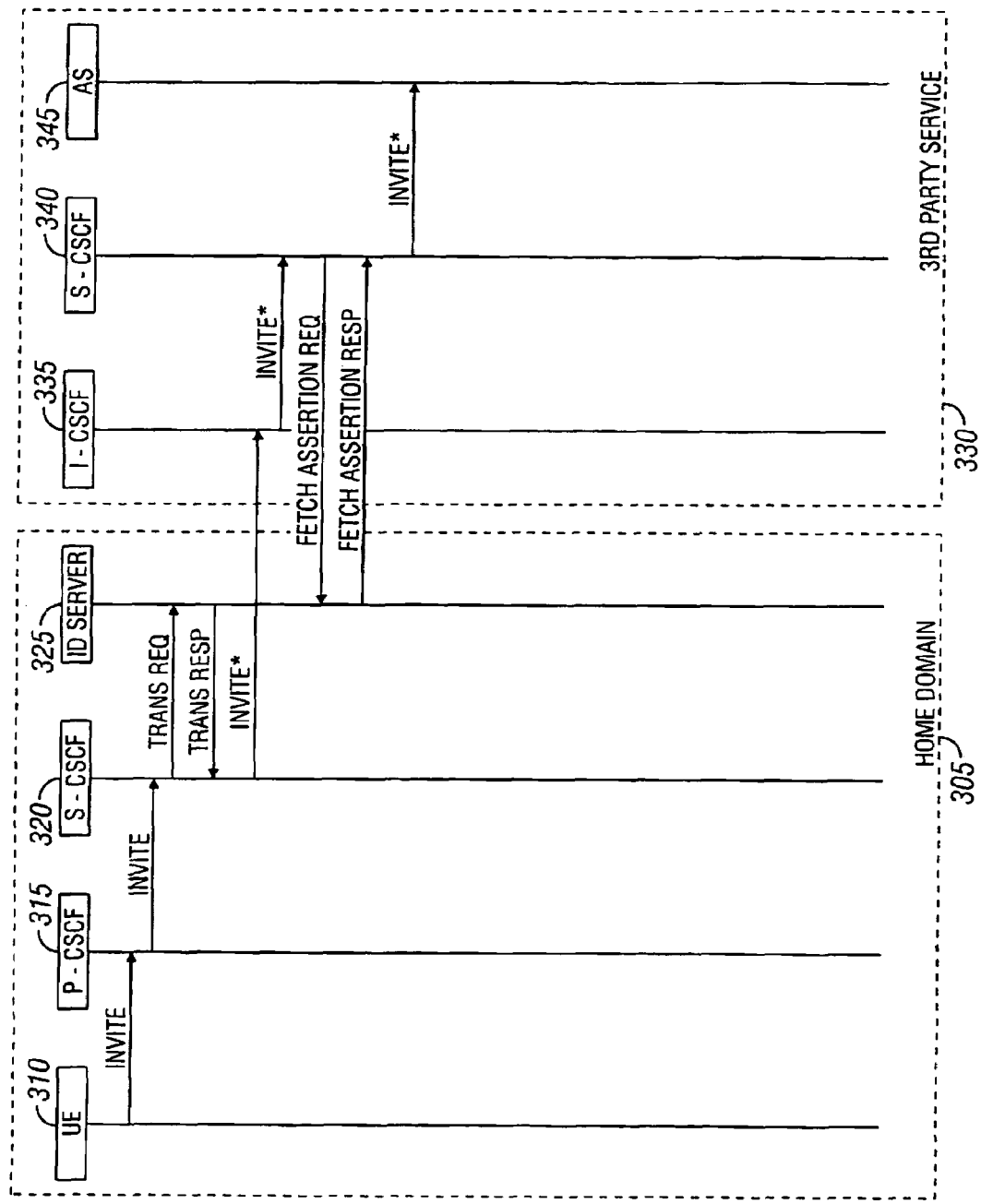
FIG. 5 is a message flow diagram illustrating the initiation of an outgoing communication session according to another embodiment of the present invention.

FIG. 5 is a message flow diagram illustrating the initiation of an outgoing communication session according to an embodiment of the present invention. The selected components depicted in FIG. 5 are divided between those of the UE 310's home domain 305 and those of $3^{rd}$ party service 330. In the home domain of UE 310 are shown P-CSCF (proxy-CSCF) 315, S-CSCF 320 and identity server 325. The illustrated components of the $3^{rd}$ party service 330 are I-CSCF (interrogating-CSCF) 335, S-CSCF 340, and AS (application server) 345.

The process is initiated by UE 310, which seeks to access services offered at AS 345. UE 310 sends an INVITE message indicating this to P-CSCF 315, which in turn generates and sends a corresponding INVITE message to S-CSCF 320. When S-CSCF 320 receives the INVITE message, it generates an identity translation request (Trans Req), which in this embodiment includes as a payload the original SIP INVITE request received from P-CSCF 315, and sends the identity translation request message to the identity server 325. The identity server 325 performs the requested identity translation that is, it modifies the identity information normally contained in the control message header by removing any explicit identifiers referring to the user of UE 310 and adding domain identifiers. The identity server 325 may also verify that the user in question is permitted to access the $3^{rd}$ party service to which the control message is addressed. There may be some limitations on the individual user, for example, or some 3$^{rd}$ party services may be blacklisted for some reason. Naturally, if access is to be denied the user should be sent a notice to this effect (not shown).

In the embodiment of FIG. 5, once the identity translation has been completed the identity server 325 generates a translation response message (Trans Resp) including the modified INVITE* message as a payload, and returns the control message to the S-CSCF 320. S-CSCF 320 then forwards an INVITE* message to the 3$^{rd}$ party service 330, specifically the I-CSCF 335, which in turn sends an INVITE* message to the S-CSCF 340. In this embodiment, S-CSCF 345 then communicates with identity server 325 using the domain identifier in the INVITE* message, sending a fetch assertion request message to the identity server 325 of the originating domain 305. The identity server 325 examines the domain identity information and, assuming that the request does in fact relate to a legitimate call session message, returns a fetch assertion response message to the S-CSCF 340 of the 3$^{rd}$ party service 310.

Upon receiving this fetch assertion response message, the S-CSCF 340 then analyzes an identity token in the response, and may at this time exercise an access control function, deciding whether the call may proceed. If so, the S-CSCF 340 generates and sends to the AS 345 an INVITE* message. Note that in an alternate embodiment (not shown), the S-CSCF 340 also may remove the identity headers from the control message as the access control function has already been exercised. In either case, at this point the call may be established by a series of positive reply messages. In other embodiments, S-CSCF 340 may add additional information to the INVITE request (also not shown), perhaps after retrieving this information from the identity server 325.

Figure 6:
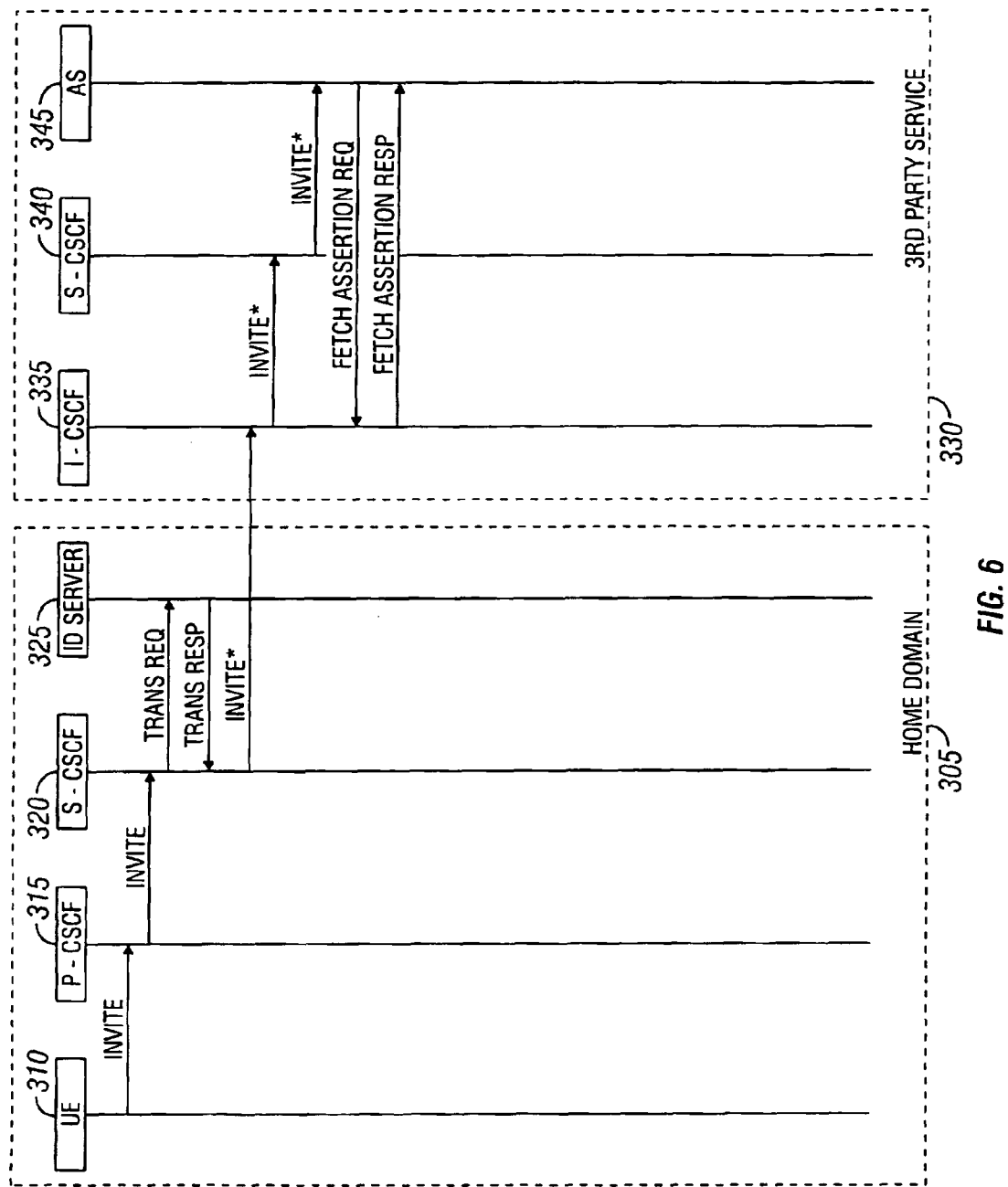
FIG. 6 is a message flow diagram illustrating the initiation of an outgoing communication session according to another embodiment of the present invention.

In other embodiments, however, the fetch assertion request may be sent from the AS 345 rather than the S-CSCF 340. FIG. 6 is a message flow diagram illustrating the initiation of an outgoing communication session according to another embodiment of the present invention. As should be apparent, this message flow is similar to that illustrated in FIG. 5, and the description of the portions that are similar need not be repeated. In the embodiment of FIG. 6, however, when the S-CSCF 340 of 3d party service 330 receives an INVITE* message formed according to the present invention from I-CSCF 335, it simply generates a corresponding message and sends it to the AS 345. In this embodiment, when the AS 345 receives the INVITE* message from S-CSCF 340, it transmits a fetch assertion request message to the identity server 325, using the domain identity information, and awaits a response. Once a satisfactory assertion response has been received, the call may be initiated. As with the embodiment of FIG. 5, however, AS 345 of 3$^{rd}$ party service 330 may elect to exercise access control (not shown), either in response to the INVITE message from the S-CSCF 340 or in response to the fetch assertion response from identity server 325.

Note that the embodiments described above presume the use of SIP signaling in an IMS environment. Other similar schemes may be used as well without departing form the spirit of the invention. In addition the SIP signaling, although typically prescribed by standard protocols, may vary from that specified or described above.

Figure 3:
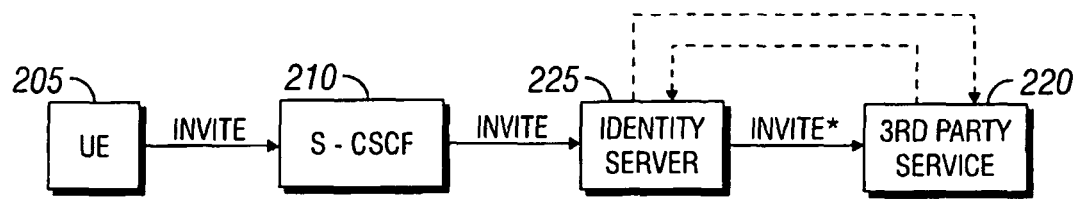
FIG. 3 is a simplified block diagram illustrating the initiation of an outgoing communication session according to another embodiment of the present invention.

Other embodiments are possible. The identity server, for example, may interact with the packet-switched (usually IMS) network in other ways. In FIG. 3, the identity server exercises its function in a somewhat different manner than described above. FIG. 3 is simplified block diagram illustrating the initiation of an outgoing communication session according to another embodiment of the present invention.

Note that the embodiment of FIG. 3 is similar though not identical to the embodiment of FIG. 2. In the embodiment of FIG. 3, the UE 205 again begins the process by sending an INVITE message including normal IMS identifiers. When the S-CSCF 210 receives the message, however, it also sends an INVITE message including normal IMS identifiers. This SIP INVITE control message is sent to the identity server 225. Note that identity server 225 may in fact be the same component acting as identity server 215 in the embodiment of FIG. 2. A different reference number is used, however, to draw attention to the different configuration of FIG. 3 and somewhat different function of identity server 225.

In this embodiment, when identity server 225 receives the INVITE message from S-CSCF 210, it removes the user ID and replaces it with a domain identifier. The identity server 225 then routes the INVITE* control message to the 3$^{rd}$ party service 220. The INVITE* control message to the 3$^{rd}$ party service 220 includes the domain identity information inserted by the identity server 225 and does not include information explicitly identifying the user of UE 225. When the 3$^{rd}$ party service receives the INVITE* message information it retrieves whatever identity assertion information it requires, for example an identity token, to permit the call session involving the user of UE 205 (whose identity is unknown to the 3$^{rd}$ party service).

Figure 4:
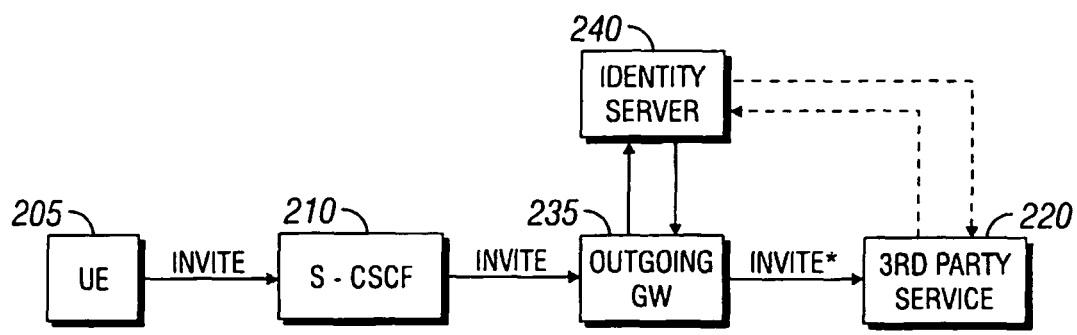
FIG. 4 is a simplified block diagram illustrating the initiation of an outgoing communication session according to another embodiment of the present invention.

In some implementations, the identity server does not communicate directly with the S-CSCF of its own domain, for example in the embodiment of FIG. 4. FIG. 4 is simplified block diagram illustrating the initiation of an outgoing communication session according to another embodiment of the present invention. As with FIG. 3, the embodiment of FIG. 4 is similar though not identical to the embodiment of FIG. 2. In the embodiment of FIG. 4, the UE 205 again begins the process by sending an INVITE message including normal IMS identifiers. The INVITE message sent by UE 205 is received in S-CSCF 210, which in turns sends an INVITE message to outgoing gateway 235. Outgoing gateway 235 may be, for example, an IBCF (interworking border control function) entity. In this embodiment, it is outgoing gateway that communicates with identity server 240 to produce the modified control message INVITE*. The INVITE* message is then sent from the outgoing gateway 235 to the 3$^{rd}$ party service 220, which optionally may retrieve an identity token from identity server 240.

Figure 7:
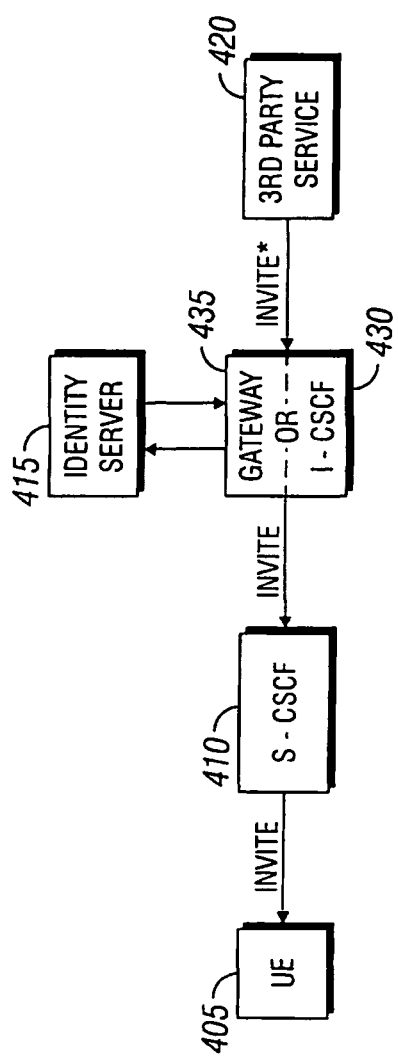
FIG. 7 is a simplified block diagram illustrating the initiation of an incoming communication session according to another embodiment of the present invention.
Figure 8:
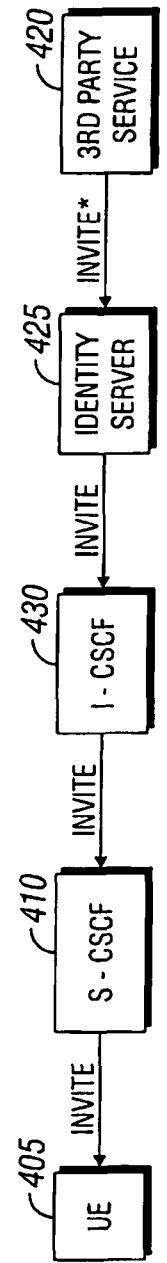
FIG. 8 is a simplified block diagram illustrating the initiation of an incoming communication session according to another embodiment of the present invention.
Figure 9:
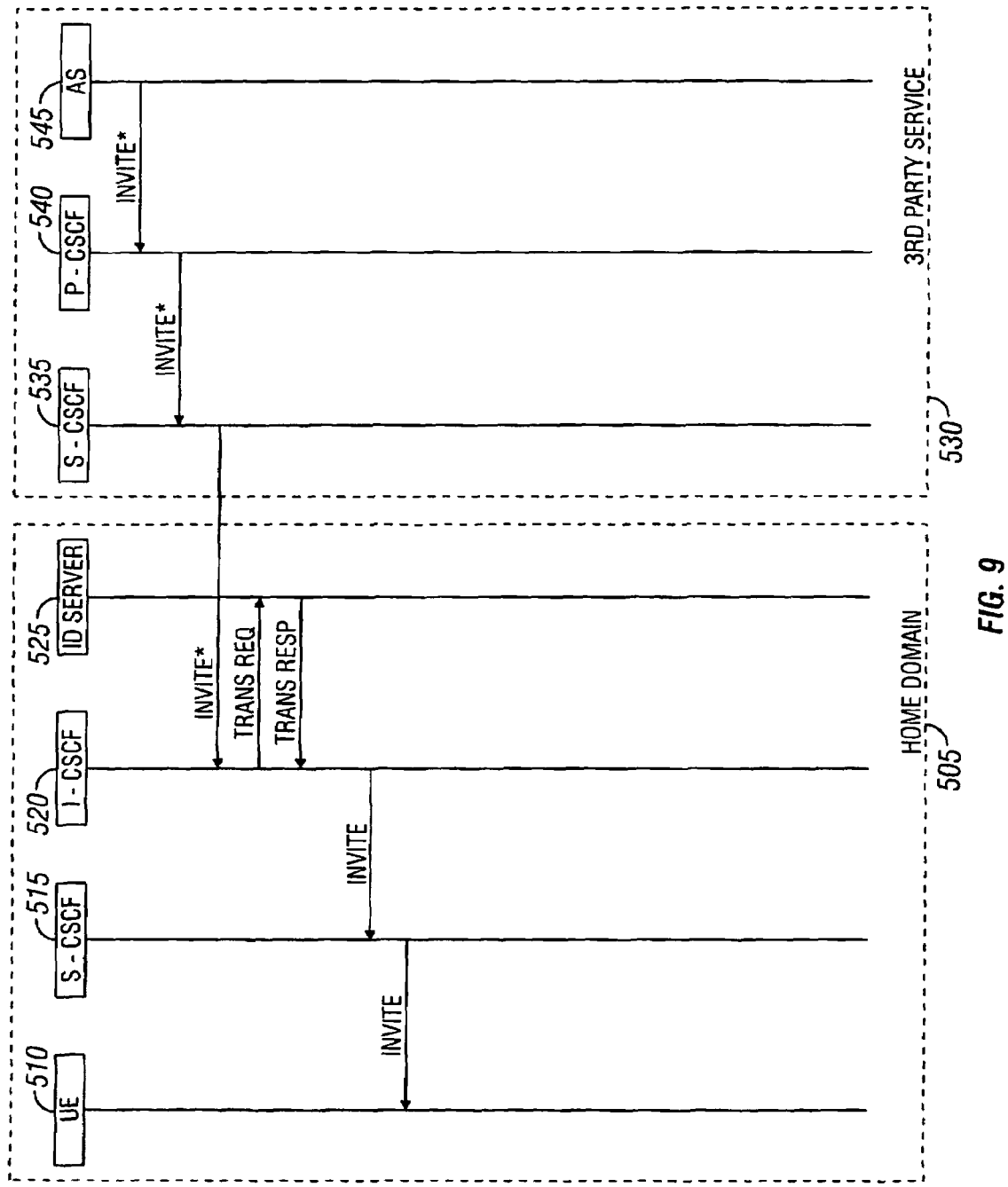
FIG. 9 is a message flow diagram illustrating the initiation of an incoming communication session according to another embodiment of the present invention.

It is noted that the set-up and other aspects of managing a communication session in a packet-switched network involves additional messaging in addition to that used in the description above. As should be apparent, subsequent messages may be handled in similar fashion so that the anonymity of the user's 3$^{rd}$ party services access is preserved. For messages targeted to the UE from the 3$^{rd}$ party service, however, a somewhat different procedure is necessary. This is especially true where the message is initiated by the 3$^{rd}$ party service, that is, is not simply a response to a user initiative. FIGS. 7 through 9 illustrate embodiments of the procedures employed in this context.

FIG. 7 is simplified block diagram illustrating the initiation of an incoming communication session according to another embodiment of the present invention. The arrangement and use of components here is similar though not necessarily identical to the embodiments of FIGS. 2 through 4. The network has not changed, of course, but different entities may be utilized for handling incoming control messages. Illustrated in FIG. 7 are the 3$^{rd}$ party service 420, which may in this embodiment access the home domain of UE 405 via a gateway 435 or an I-CSCF 430. (Note these two components are illustrated together for simplicity; while they may actually reside on the same physical component, this is not necessarily the case. And depending on the network, only one may actually be available for the purpose described here.) In the embodiment of FIG. 7, both gateway 435 and I-CSCF 430 communicate with identity server 415 and with S-CSCF 410. When an INVITE* message from the 3$^{rd}$ party service 435 arrives at gateway 435/I-CSCF 430, it is included as the payload in a translation request (Trans Req) message to identity server 415. Identity server 415 performs identity translation (presuming it is necessary) by removing the domain identity and, if present, any additional identifying information that is not needed for routing within the home domain. The identity server 415 also adds an explicit user identifier, which in most cases will be a normal SIP identifier in the control message header. A translation response (Trans Resp) is then sent back to the gateway 435/I-CSCF 430, which uses it to generate and send an INVITE message to the S-CSCF 410. S-CSCF 410 then sends a corresponding INVITE message to UE 405 so that the communication session may be initiated.

Variations on this procedure are possible, for example as with the outgoing message translation, the gateway 435/I-CSCF 430 may simply invoke the services of the identity server 415, which may return the appropriate instructions and identity information so that the gateway 435/I-CSCF 430 may generate the INVITE control message correctly. Also similar to the outgoing message embodiments, the interface between the gateway 435/I-CSCF 430 and the identity server 415 may be an IMS ISC interface, or it may be a Web services interface such as HTTP.

Importantly, either the gateway 435/I-CSCF 430 or the S-CSCF 410 may exercise an access control function by denying access to the UE 405. The 3$^{rd}$ party service lacks an explicit address for the user of UE 405, and therefore must submit to this access control. The access control may, for example, completely bar access by 3$^{rd}$ party services, or by this particular 3$^{rd}$ party, or may demand additional information or assurances before proceeding.

A similar call initiation process is illustrated in FIG. 9. FIG. 9 is a message flow diagram illustrating the initiation of an incoming communication session according to another embodiment of the present invention. Here, home domain 505 includes a UE 510, a S-CSCF 515, an I-CSCF 520, and identity server 525. 3$^{rd}$ party service 530 includes S-CSCF 535, P-CSCF 540, and AS 545. When AS 545 wishes to initiate a call to UE 510, it sends an INVITE* message to P-CSCF 540. Here, it is presumed that AS 545 is in possession of an identity token that may be associated by identity server 525 with UE 510, and that the identity token is included in the INVITE* message. Upon receiving the INVITE* message, P-CSCF 540 generates a corresponding message and sends it to S-CSCF 535. S-CSCF 535 sends an INVITE* message to the I-CSCF 520 of the home domain of UE 410, the I-CSCF 520 being known to 3$^{rd}$ party service 530 from a previously-received domain identifier (or acquired in some other fashion). As described above, I-CSCF 520 then invokes identity server 525 to perform any necessary identity translation, here using a Trans Req and Trans Resp exchange. An INVITE control message may then be sent to the S-CSCF 515 and UE 410, assuming that an access control function has not denied access.

A somewhat different configuration is shown in FIG. 8. FIG. 8 is simplified block diagram illustrating the initiation of an incoming communication session according to another embodiment of the present invention. In this embodiment, 3$^{rd}$ party service sends an INVITE* message directly to the identity server 425, which performs any necessary identity translation operations and itself routes the modified control message by sending an INVITE message to I-CSCF 430. I-CSCF 430 then sends a corresponding message to the S-CSCF 410, which in turn sends an INVITE message to UE 405 so that the session may be initiated. Again, access control may be exercised by the identity server 425, or by either CSCF entity.

Figure 10:
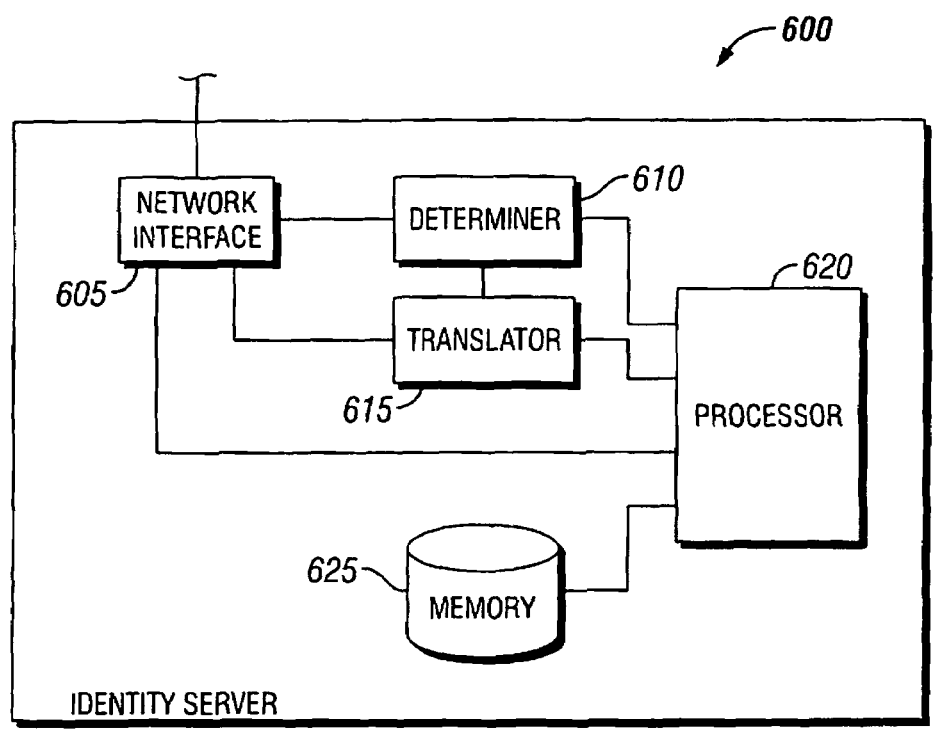
FIG. 10 is a simplified block diagram illustrating selected components of an identity server configured according the present invention.

FIG. 10 is a simplified block diagram illustrating selected components of an identity server 600 configured according the present invention. In this embodiment, identity server 600 includes a network interface 605 for interfacing with other entities in the packet-switched network (not shown). Specifically as it regards the present invention, network interface may for example be used to receive and route control messages, or it may be used to exchange translation request and response messages, or provide identity translation instructions to other network nodes. A determiner 610 coupled to the network interface 605 makes a determination whether identity translation is required. Note that in many implementations, almost all control messages between a UE and a 3$^{rd}$ party service may require translation. In other implementations, more discriminating criteria may be used. The determiner may also make a determination as to what type of identity translation is required based on the type of message received and the direction in which it is being propagated.

Translator 615 is coupled to the network interface 605 and to the determiner 610, and is adapted to perform any translation identity determined to be required. A processor 620 is provided to control operation of the other components, and a memory device 625 is available to store, among other things, translation instructions and data associating the user with, for example, an identity token or domain identifier provided to a 3$^{rd}$ party service. Note that the components illustrated in FIG. 10 are exemplary, and others may be present as well. Note also that any of the components may be combined into a single component performing multiple functions, or divided into a number of cooperating components.

Figure 11:
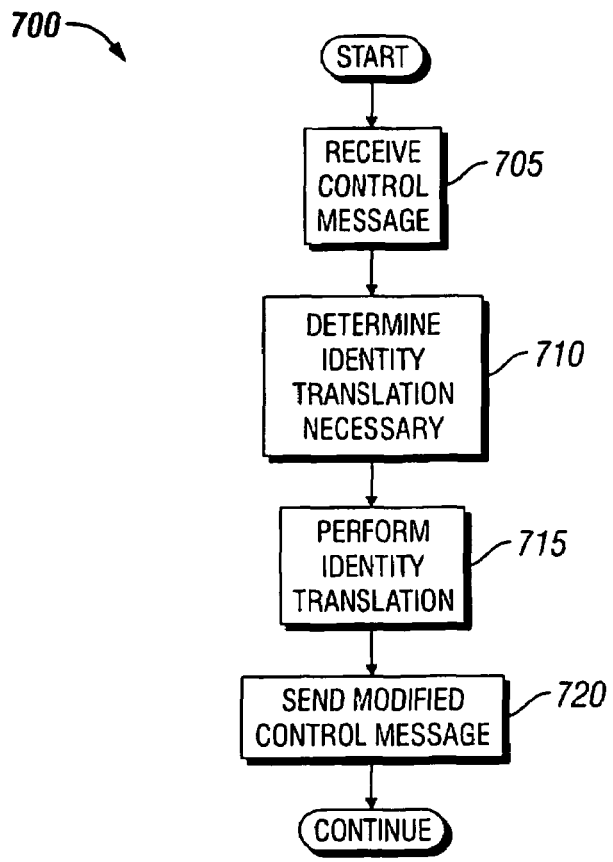
FIG. 11 is a flow diagram illustrating a method according to an embodiment of the present invention.

FIG. 11 is a flow diagram illustrating a method 700 according to an embodiment of the present invention. At Start, it is presumed that the hardware and software required for performing the method 700 is available and operational. This embodiment of the present invention also presumes that a user with device UE is in able to communicate with a communication network, and wishes to establish a communication session with a service entity that is also in communication with the communication network.

The process of method 700 begins when a control message is received in the identity server (step 705). A determination is then made as to whether identity translation is necessary (step 710). This determination involves, of course, whether the control message relates to whether the prospective communication session involves a 3$^{rd}$ party service, and also involves the type of message received and its content. It may also involve an access control function, as if access is to be denied or the communication session is not going to be permitted, no translation is necessary. Other criteria, of course, may be used as well.

In this embodiment, assuming a positive determination, identity translation is then performed (step 715). As described above, this may involve a variety of different message modifications dictated by the type of message involved and the direction in which it is targeted. Once any necessary identity translation has been performed, the modified message is sent (step 720) to the next node as necessary to route it to its intended destination. The process then continues as additional control messages are received and translated as necessary.

In this manner, a method and device are provide for facilitating secure communications between a home domain, and specifically a user associated with the home domain, and a 3$^{rd}$ party service that is not part of the home domain and, in fact, may not be otherwise known to it or trusted. The user is provided with full access to the 3$^{rd}$ party services, including the ability to receive replies and even 3$^{rd}$ party initiated calls, subject to access control by the home domain, while remaining anonymous to the 3$^{rd}$ party services provider.

Although the present invention has been described in detail, those skilled in the art should understand that they can make various changes, substitutions and alterations herein without departing from the spirit and scope of the invention in its broadest form.

What is claimed is:

1. A method of providing secure communication session set-up between a user of a UE (user equipment) associated with a home domain configured according to an IMS (IP (Internet Protocol) Multimedia System) architecture and a third party service that is not associated with the home domain, the method comprising:
   receiving, in an identity server associated with the home domain, a control message relating to the secure communication session;
   determining that an identity translation of the control message is necessary;
   performing the identity translation of the control message by:
      removing, if a control message target is an entity associated with the third party service, a user identifier identifying the user of the UE and adding a domain identifier identifying the home domain of the UE such that an identity of the user of the UE will be masked from the third party service; and
      removing, if the control message target is the UE, a domain identifier identifying the home domain of the UE and adding a user identifier identifying the user of the UE;
      adding an identity token to the control message; and
      sending the identity translated control message to the control message target.

2. The method according to claim 1, wherein the control message is an SIP (Session Initiation Protocol) message.

3. The method according to claim 2, wherein the control message is an INVITE message.

4. The method according to claim 1, further comprising receiving a request for an identity token from a requesting entity associated with the third party service.

5. The method according to claim 4, wherein the requesting entity is a CSCF (call session control function) server.

6. The method according to claim 4, wherein the requesting entity is an AS (application server).

7. The method according to claim 6, wherein the control-message target is the AS.

8. The method according to claim 1, wherein the identity server receives the control message from a home domain proxy server.

9. The method according to claim 8, wherein the identity server sends the identity translated control message to the home domain proxy server.

10. The method according to claim 8, wherein the identity server sends the identity translated control message to a server associated with the third party service.

11. The method according to claim 1, wherein the identity server receives the control message from an outgoing GW (gateway).

12. The method according to claim 1, wherein the identity server receives the control message from a server associated with the third party service.

13. The method according to claim 12, wherein the identity server sends the identity translated control message to a home domain server.

14. The method according to claim 1, wherein the identity server receives the control message from a home domain server.

15. The method according to claim 1, wherein the identity server receives the control message from a home domain incoming gateway.

16. An identity server, having a microprocessor and an associated non-transitory memory, for securing communications between a user of a UE (user equipment) and a third party service, the identity server being resident on a node in an IMS (IP (Internet Protocol) Multimedia Subsystem) network, the identity server comprising:
   a network interface for receiving a control message and for sending translated control messages;
   a determiner coupled to the network interface for determining identity translation of the control message is necessary; and
   a translator for performing identity translation of the control message, when identity translation is determined to be necessary by the determiner, by:
      removing, if a control message target is an entity associated with the third party service, a user identifier identifying the user of the UE and adding a domain identifier identifying a home domain of the UE such that an identity of the user of the UE will be masked from the third party service;
      removing, if the control message target is the UE, a domain identifier identifying the home domain of the UE and adding a user identifier identifying the user of the UE; and
      adding an identity token to the control message.

17. The identity server according to claim 16, wherein the network interface is adapted for receiving SIP (Session Initiation Protocol) control messages.

* * * * *